United States Patent [19]

Gindi et al.

[11] 4,103,336
[45] Jul. 25, 1978

[54] METHOD AND APPARATUS FOR ALLOCATING BANDWIDTH ON A LOOP SYSTEM COUPLING A CPU CHANNEL TO BULK STORAGE DEVICES

[75] Inventors: Abraham M. Gindi, San Jose; Donald John Lang, Cupertino, both of Calif.

[73] Assignee: International Business Machines Incorporated, Armonk, N.Y.

[21] Appl. No.: 708,509

[22] Filed: Jul. 26, 1976

[51] Int. Cl.² ............................ G06F 3/00; G06F 9/00
[52] U.S. Cl. ...................................... 364/900; 364/300
[58] Field of Search .................................. 340/172.5; 364/200 MS File, 900 MS File

[56] References Cited

U.S. PATENT DOCUMENTS

| | | | |
|---|---|---|---|
| 3,680,056 | 7/1972 | Kropfl | 340/172.5 |
| 3,699,529 | 10/1972 | Beyers et al. | 340/172.5 |
| 3,879,710 | 4/1975 | Maxemchuk et al. | 340/172.5 |

Primary Examiner—Raulfe B. Zache
Attorney, Agent, or Firm—R. Bruce Brodie

[57] ABSTRACT

A loop system couples a CPU channel to bulk storage devices via a loop controller and device adapter. The loop system is characterized by equal fixed-length, multi-byte frames, each frame of which being assignable to only one terminal at a time. The system is further characterized by having a fixed loop delay greatly exceeding the frame duration by virtue of the high data rate.

Dynamically variable frame assignment occurs when the primary terminal generates an unassigned empty frame in response to each assigned full (read) frame from a secondary terminal. The primary further generates an assigned full (write) frame upon receipt of each service (write) request frame from a secondary terminal. Lastly, the primary can send access command frames for each received unassigned empty frame or any other frame that does not imply a demand for bandwidth by the secondary. Relatedly, each secondary terminal can optionally write over a frame assigned to it or should it not have a message or data to send to the primary, change the "full" frame to "empty", or to seize an unassigned empty frame as it passes by on the loop. The combination of secondary terminal frame reuse with that of the primary tends to distribute frame availability on a more nearly uniform basis.

6 Claims, 8 Drawing Figures

LOOP CONTROLLER ALGORITHM

DAD FRAME USE ALGORITHM

DAD READ ALGORITHM

DAD WRITE ALGORITHM

WAVE FORM RELATIONS AMONG DIFFERENTIAL SIGNALS,
POSITIVE AND NEGATIVE DATA PULSES,
AND THE PHASE LOCKED OSCILLATOR CLOCK

METHOD AND APPARATUS FOR ALLOCATING BANDWIDTH ON A LOOP SYSTEM COUPLING A CPU CHANNEL TO BULK STORAGE DEVICES

BACKGROUND OF THE INVENTION

This invention relates to bandwidth allocation on loop systems coupling high data rate devices, and, more particularly, to systems coupling a CPU channel to bulk storage devices such as disks and tapes.

Loop systems capable of transmitting data at megabyte per second rates customarily use equal fixed length multibyte frames, each frame being assignable to only one terminal at a time. Also, such systems may have a loop delay or latency greatly exceeding the fixed length frame duration by virtue of the high data rate.

A CPU channel accesses data on DASD storage devices by communicating a series of instructions identifying the record location in terms of disk drive, storage volume, disk(track) and angular position and the reading or writing operation of interest. The instructions termed channel command words are interpreted by a controller common to the disk drives for actually positioning the access mechanism relative to the storage device and executing the read or write operation. Because the availability of the channel and the response times of the storage system to the accessing, reading, and writing of records varies, the coupling between the channel and the DASD is "loose", i.e., transfers are made by way of a demand/response protocol. This means that the status of a device is first ascertained and if it is available, then one data transaction can take place. This minimizes the need for buffering even though the "speeds" of the devices differ.

The coupling of a CPU channel to a plurality of storage devices on a time shared basis via a loop does not change the protocol in principle. It does mean that account must be taken of the special characteristics of loops. For example, loops for use with high date rate storage devices must make provision for disconnecting a terminal which might overrun the system. Alternately, locking out of those terminals which prospectively could overrun the system is desirable. This situation occurs for two reasons. First, bulk storage devices such as disks and tapes lack a start/stop capability on a character basis. In contrast, they transfer data by multiple byte, record, or entire track. Second, for volume transfer, a broad bandwidth (high data rate) is mandatory. In this regard, overruns occur when the available loop bandwidth is less than the aggregate bandwidth of all terminals requesting service.

A loop protocol for coupling the channel and storage devices must provide for sending access commands from the channel, writing of data only to the extent that the receiving device can accommodate the transfer, and allocating bandwidth so as to avoid blocking some loop secondary terminals in favor or others or overrunning of the device. In the prior art, some loop protocols assign a frame/slot to a device on a permanent basis. Consequently, time (bandwidth) is wasted if the slots are not utilized. Where a loop protocol requires the primary terminal to centrally allocate slots, the primary will not be cognizant of the instantaneous data rate variations of devices. This, in turn, requires the primary to transmit assigned frames/slots at a rate higher than the device. This, too, is wasteful because no other device can utilize the excess bandwidth assigned to the overrunning device. Still other loop protocols utilize distributional schemes such as optional response polling. In an ORP system, the overhead frames at the beginning of each cycle together with its variable length place buffering requirements on each device. The number of wasted frames is at least equal to the loop latency during each ORP cycle.

Any loop system time sharing its facilities among different addressable terminals needs a frame format having an address, control, and data portion thereof. The address portion must include the addressee and/or may include an addressor. The control portion is usually reserved for indicating type or mode, i.e., service request, command, write, read, device status and frame status, i.e., available/unavailable, full/empty. The frame format as might be expected implements the demand-/response protocol. For example, if the channel wants to write data on a specific storage device, then the storage device must have some way of positively indicating availability and readiness to receive data. This is communicated by means of a status frame. To avoid being overrun, the device sends a "write" request" frame from the secondary to the primary whenever its data buffer has space for one frame of data. In order to allow as small a data buffer as possible, this loop protocol constrains the primary to respond to every write request with a minimum and invariable time delay. The secondary can take advantage of the resulting invariable loop latency by sending its request before it actually needs the data.

Reference is made to Dixon, IBM Technical Disclosure Bulletin, Vol. 15, No. 1, June 1972, pages 335–336 and Spragins, IBM Technical Disclosure Bulletin, Vol. 16, No. 1, June 1973, pages 302–305. These references treat dynamic frame/slot reallocation and consequent bandwidth distribution in terms respectively of slot use/reuse at a loop secondary terminal and the relation between unassigned empty frames generated by a primary terminal and the queue of data (messages) at secondary terminals.

In Dixon, a slot addressed to a particular loop terminal may be seized by that terminal and "reused" by overwriting the address portion of the slot with another address or a special character. The effect of the special character is to create an unassigned slot. Of course, an unassigned slot can be "used" in the first instance by the first terminal desiring to communicate data or request service. Dixon is directed to revising the statistical bias by which upstream terminals have greater access to unassigned frames generated by the primary toward a more nearly uniform access.

In Spragins, messages are transmitted, say, a byte at a time, in individually addressable slots. In this case, the primary terminal generates unassigned time slots as an inverse function of the average number of messages per time slot as a parameter. If the average were 0.1, then the primary would insert an unassigned slot after ten addressed slots had been sent. If the average was 0.5, then the primary would alternate the sending of assigned and unassigned slots.

For purposes of completeness, reference should also be made to Deutsch et al, U.S. Pat. No. 3,639,694, "Time Division Multiplex Communications System" issuing on Feb. 1, 1972; and Arulpragasam, U.S. Pat. No. 3,739,904, "Data Communication System of Loop Configuration and Serial Transmission of Time Slots," issuing on Feb. 1, 1972. These references describe systems designed for slow loop transmission rates and low speed terminals in which no consideration is given to the buffering requirements of overrunable devices on the loop whose data rates are comparable to the loop latency.

Deutsch et al sets up an entire sequence of N frames (channels) where one or more frames are assigned to each of the active terminals on a loop. At least one of the frames in the sequence is unassigned and can be used by inactive terminals so as to request bandwidth. Significantly, for the duration of one assignment set, there are no adjustments of bandwidth occupancy based on demand for bandwidth or the lack of it by the active terminals on a one-for-one basis.

The Arulpragasam patent uses a protocal similar to that of Deutsch, but without the fixed sequence of frames. In Arulpragasam, in order to transmit a message, a terminal must send a request for service in the first free time slot. It cannot, however, send the message until it receives a "proceed" signal from the central station. The fastest that any terminal can transmit is the time it takes to make two journeys around the loop. The central station in the Arulpragasam system is not constrained to answer the bandwidth request in the next outgoing frame.

Lastly, attention is directed to Gindi, U.S. Pat. No. 4,042,783, "Method and Apparatus for Byte and Frame Synchronization on a Loop System Coupling a CPU Channel to Bulk Storage Devices," issuing on Aug. 16, 1977. This reference teaches means for synchronizing frame delimited bit stream messages on a high speed loop for communication between bulk storage devices attaching loop secondary terminals on one hand and a CPU/channel attaching the loop primary terminal on the other hand. Also disclosed, is the improvement of transmission efficiency by the logical assignment for loop attachment only those loop secondary terminals whose storage elements have an aggregate bandwidth less than the available instantaneous loop bandwidth.

SUMMARY OF THE INVENTION

It is an object of this invention to improve utilization of bandwidth (bandwidth occupancy) among terminals communicating on a loop system. It is a further object to effectuate the improvement on loops attaching high data rate devices such as CPU channels and bulk storage devices so as to minimize the data buffering requirements in the devices and further to avoid either the devices being overrun by the loop or vis a' vis. It is a specific object to improve bandwidth occupancy in loop systems by a new dynamic frame allocation method and means.

In this invention, a secondary terminal ready to transmit data to the primary must first seize an unassigned empty frame and request permission of the primary. Responsive to the request, the primary terminal attaches the secondary to the loop only if the aggregate bandwidth is less than the available instantaneous loop bandwidth. This locks out those terminals which prospectively could overrun the loop. This also assumes that there exists an average or maximum value for each terminal. It further assumes that the algebraic sum of the differences between the actual and assigned values will be negligible. Relatedly, the invention uses an availability status bit in each frame indicative of the occupancy of the loop. If fully occupied (no available bandwidth), new requests cannot be honored.

Dynamic frame allocation occurs at the primary terminal and optionally at the secondary terminals. In this regard, the invention contemplates a one-to-one relation between the type of frame received from a secondary and the type of frame generated by the primary. Thus, an unassigned empty frame is generated in the next outgoing frame in response to each assigned full (read) frame from a secondary terminal. The primary further generates an assigned full (write) frame upon receipt of each service (write) request. Lastly, the primary can send an access command only upon receipt of a frame that does not imply a request for bandwidth, such as for each received unassigned empty frame. By generating an unassigned empty frame in response to each assigned full frame, bandwidth is available for data transfer from any ready storage device (secondary terminal). Overrun of the loop cannot occur because the one-to-one relation merely reallocates the same loop bandwidth in direct relation to its utilization by the secondary terminals. Overrun of a device is eliminated by sending one frame full of data only upon receipt of one service (write) request from the secondary.

Unassigned empty frames, if returned to the primary, represent bandwidth available for alternate uses. One such use is the transmission of a command frame, upon receipt of which the addressed secondary terminal can access the attached storage device. Another use would be to recirculate the unassigned empty frame.

The generation of unassigned empty frames does increase frame availability in favor of upstream terminals nearest the primary and against the downstream terminals nearest the primary. The expectancy can be rendered more nearly uniform as among the terminals by way of a secondary terminal frame use/reuse protocol. This takes advantage of permitting a secondary terminal to seize a frame addressed to it and "reuse" it as by sending a service (write) request to the primary. Or, if the secondary has no write request to send, it must alter the "assigned" character to "unassigned". Or, if it is unassigned the secondary can "use the frame" by sending a frame full of data (assigned full (read) frame), request service, or status.

DESCRIPTION OF THE PREFERRED EMBODIMENT

Figure 1:
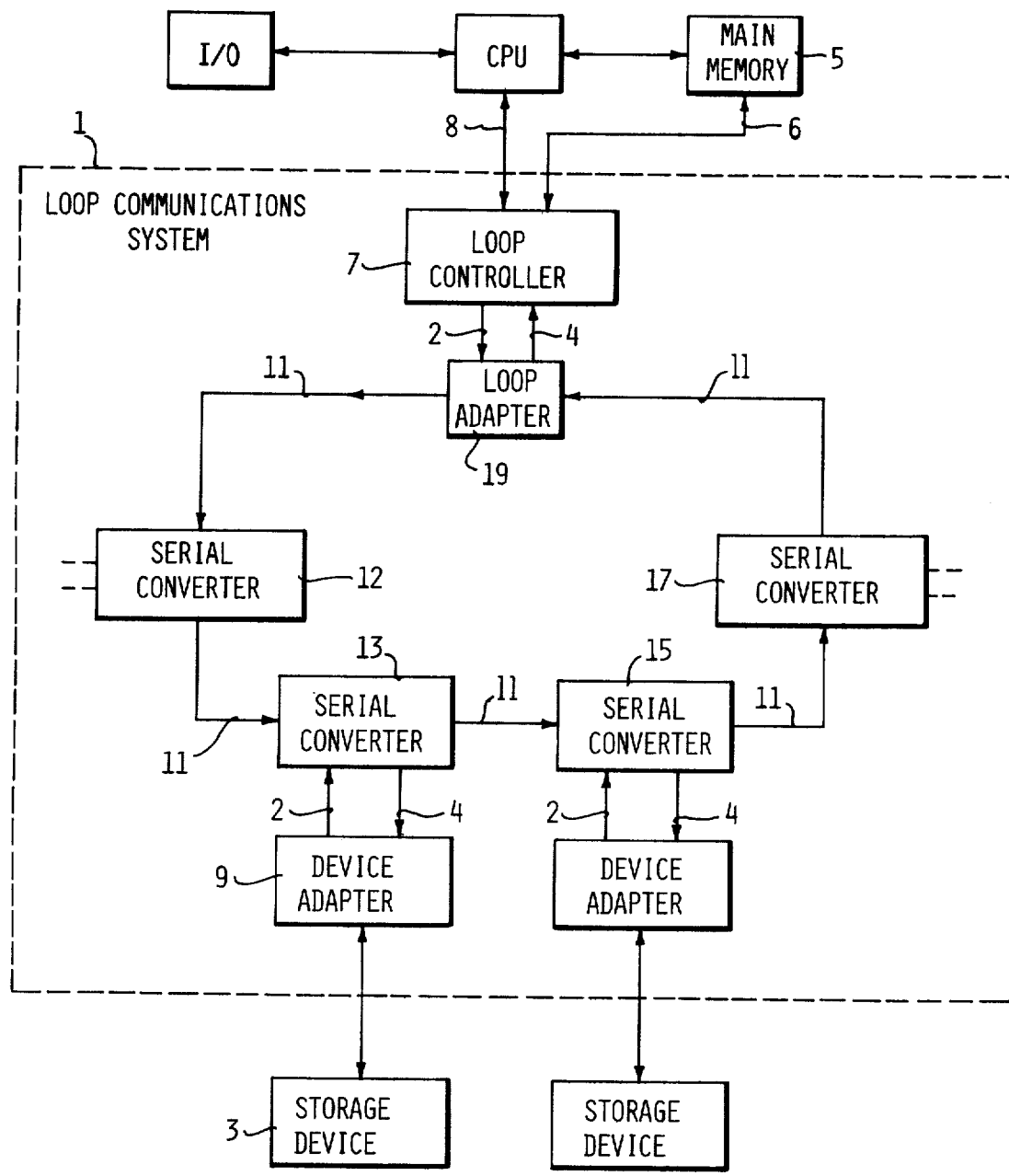
FIG. 1 shows a loop system attaching a CPU channel and a plurality of storage devices.

Referring now to FIG. 1, there is shown a loop communications system 1 for coupling one or more storage devices 3 to computer main memory 5. The main memory is coupled to loop controller 7. In this regard, the loop controller is also termed the primary terminal. Storage devices such as disks or tapes are terminated in device adapters 9, also designated as secondary terminals. The loop itself consists of a unidirectional communication path 11 serially connecting serial to parallel converters 12, 13, 15, and 17 and adaptor 19. The insertion of data onto the loop is accomplished by the parallel-to-serial conversion from a loop or device adapter through the serial converter. Likewise, the removal of data from the loop is occasioned by the series-to-parallel conversion through the converter device or loop adapter.

FRAME SIZE, TYPE, AND FORMAT

In the system shown in FIG. 1, a fixed frame size of 108 bits is used. This includes 64 bits of data plus overhead. The frame size in any particular instance is the result of tradeoffs and compromises. It is evident that frame efficiency could be improved, for example, by using longer frames with greater data-to-overhead ratio. Any given protocol can operate with any frame size that is desirable in a particular implementation, and it is possible to operate the subsequently described protocol with a variable frame size. For the sake of simplicity, only an equal fixed length frame system is described.

In order to permit a high data rate, clocking information is transmitted every ninth bit as a "one" bit delineating each byte of information. These bits are referred to as synch bits in this context.

This invention uses four types of frames. These are blank, synch, empty, and full frames. The blank and synch frames are non-operative in that they are used in the automatic synchronizing routine to lock the clocks of all the device adapters. Parenthetically, an "empty frame" is one that does not contain information and may be used by any secondary terminal but has information to send to the primary terminal. In the frame format, bit positions 0 and 1 define the start of a frame, if coded as a 1 and 0 respectively. Wherein they are both positioned right after a synch bit such that the bit sequence is 110. In this regard, bit position 2, when set to 0, indicates that the loop bandwidth is saturated and no new requests for data transfer will be honored. Bit position 3 indicates frame availability when set to 1. Bit position 4, when set to 1, indicates the frame is empty and may be used to send, read, or for status information. When bit position 4 is set to 0, the frame is full. Bit positions 5, 6 and 7 define the operation or function of the frame. Bit positions 8 to 15 defining a device adapter/serial converter address contains only the address of that device adapter which can perform the data transfer operation defined by the mode bits 5, 6, 7. Only one data transfer operation at a time can be executed. Bit position 16-79 defining the data field contains eight bytes of data when the mode bits indicate read or write. If the mode indicates a command or a status frame, then the command and its parameters or the status information will be contained in the data field. The data field of a write request or an empty frame is not defined. It must not, however, contain code sequence 1, 0 repetitively in the first two bits of each byte. This repetitive pattern as distinct from random data will delay a device adapter/converter that is trying to regain true synch. Lastly, bit positions 80-95 are used for error detection. The polynomial range for the CRC are the 96 bits in each frame. The twelve synch bits are not included. Relatedly, a device adapter/converter that alters a frame in any way must send a correct cyclic redundancy code byte irrespective of the relevance of the data. A device adapter/converter may not correct an erroneous CRC of any frame that is passing through.

In loop systems of the type described, the modes of the frames may be partitioned into commands, status frames, read/write frames, write requests, and empty frames. Commands are sent from the CPU to loop controller 7 and, thence, to the device adapter in order to initiate operations. In most cases, a command and its parameters can be sent in one frame. The addressed device adapter upon receiving a command frame must change it to empty or use it for sending outstanding status. In general, a frame that is to be emptied may be treated as an empty frame for all purposes. Note, that the outgoing CRC of any frame that has been modified by a device adapter in any way must correctly reflect the entire frame. A read frame is used to send read data from storage device 3 to loop system 1 to main memory 5. A read frame can be sent on any incoming empty frame limited by the maximum bandwidth imposed upon the particular storage device. Write frames are sent out only in response to write requests on a one-for-one basis. The time lapse between the start of a request frame and the receipt of the corresponding write frame at the device adapter is equal to the loop latency. The loop latency, determined by the cable length, number of secondaries, etc. is invariable. A write request frame is sent by device adapter 9 to the loop controller to request write data. A device adapter may send write requests only after receiving a write command from the loop controller. Write requests, for example, may be sent on any empty frame or on a write frame addressed to the device adapter. Lastly, an empty frame originates from the loop controller and is an invitation to any device adapter to send read, status or request frames. An empty frame may also originate from any device adapter that has received a write or command on that frame. To utilize an empty frame, the device adapter checks only the first five bits of the frame. All other bits are ignored.

FRAME USE, REUSE, AND LOOP LATENCY

Loop controller 7 and device adapter 9 execute protocols which give relatively fast response times in terms of loop latency. This is accomplished by designing the serial converter paired with an adapter so as to have a minimum of delay to the loop data. This means that the device adapter/converter is not able to empty out a frame that contains write data for it. By the time the address is compared, the beginning of the frame and most of the addresses have already been transmitted and cannot be changed. The device adapter has the option of changing the rest of the frame into a request for more data, or allowing it to continue unchanged, in which case no other device adapter can use the frame. It is therefore necessary for the device adapter to use write frames for its write requests, as much as possible, so as not to be wasteful of loop bandwidth. In a modified version of this protocol, referred to as the "frame reuse protocol" (FIG. 5), each device adapter effectuates a longer delay to the loop data so that after recognizing its own address it can empty the frame to allow other device adapters of the loop to use it. The device adapter may also use the frame for requesting another frame of write data if it wants to, but it is not obligated to do so since it does not represent wasted bandwidth, anymore. The frame reuse protocol version is more efficient of loop bandwidth and more desirable if the resulting long term loop latency can be tolerated.

Loop latency is the total delay around the loop expressed in frames including cable delay, device adapter delay and loop adapter delay as rounded up through an integral number of frame time periods. Specifically, loop latency for a storage loop having a frame time of 771 nanoseconds may vary from a minimum of three frames (2.31 microseconds) to a maximum of 26 frames (20.05 microseconds). This maxima was determined for a particular implementation by selected physical characteristics of the highest speed adapter on the loop.

THE LOOP AND SIGNAL CONDITIONING

Figure 8:
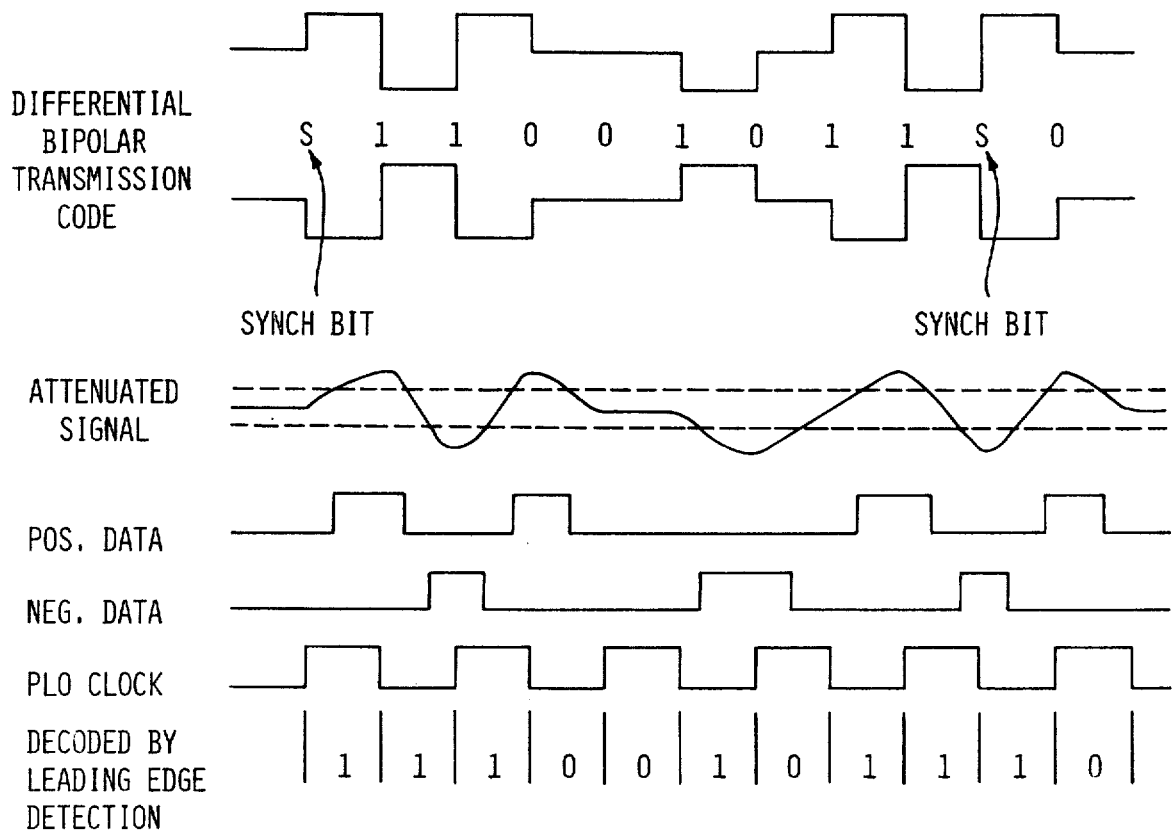
FIG. 8 is a timing and wave form diagram of a system using a bipolar ternary code with reference to loop synchronization.

Referring now to FIG. 8, taken together with FIG. 1, data is transmitted along loop 11 in serial form. The loop itself may be fabricated from a twin axial cable RG22BU. Consistent with twin axial transmission, data is transmitted upon the two conductors in differential mode, that is, the signal on each conductor is the electrical inverse of the other. This is summarized in FIG. 8. Cable receivers would consist of a differential type amplifier with a high common mode rejection ratio. This takes advantage of the superior noise rejection ability of the cable. Data encoded in a bipolar pseudo-ternary code represents each "1" bit by an alternate positive or negative pulse. Each is fixed at 1 bit cell time duration. A "0" is represented by the absence of a pulse.

SYNCHRONIZATION AND CLOCKING

In order to clock and deserialize the data properly, it is necessary to derive clocking information from the timing of the data bits. Since a long string of zeros can occur in a normal data stream, it is necessary to insert synchronizing bits at regular intervals. Consequently, a synch bit is inserted after every 8 data bits.

Data is serialized on the loop with the high order bit of the high order byte first. A data field consisting of eight bytes will be transmitted as a binary field beginning with $2^{63}$, $2^{62}$, ... in a decreasing power of two.

The loop communication system of FIG. 1 includes a synchronization system. The synchronization system has the communication function of maintaining accurate and stable synchronization during operation and redeeming synchronism in as short a time as possible after the loss of synch due to electrical noise or other causes of interruption.

The invention utilizes two types of synch information transmitted on the loop. These are bit synch and frame synch, both of which must be attained and further confirmed by a cyclical redundancy code (CRC) check before true synch is achieved. "True synch" is one of several synch states or levels to be described separately. For present purposes, true synch is a necessary prerequisite before a serial converter 12, 13, 15, 17 can transmit information onto the loop. True synch must also be achieved by the receive (read) element of the loop adapter 19 before anything other than synch frames can be transmitted onto the loop.

The clocking system of each serial converter and its bit and byte counters must be synchronized to the incoming loop data in order to perform the functions of receiving, reclocking and transmitting loop data. In this invention, when a serial converter is out-of-synch, it transmits only blank frames. When the loop adapter is out-of-synch or if it is receiving "blank" frames, then it transmits only synch frames. These synch frames are passed through each converter unchanged by the upstream converters. When an out-of-synch adapter/converter receives the synch frames, then it synchronizes its clocking system, such as a phase locked loop. When it is finally in synch, the converter passes through the synch frames downstream. When the loop adapter receives the synch frames, it transmits other information on the loop in order to assist the affected converter to verify that it has again achieved true synch. After this the loop may resume transmission of normal protocol frames.

FRAME FORMAT AND SYNCH BITS

Loop controller/adapter 7, 19 generates fixed equal length frames of 108 bit times in duration. The first two-bit positions define the frame synch code and together with a previous synch bit define the start of each frame. Bit position 2 defines interrupt suppression, bit 3 deals with availability, while bit 4 indicates whether the frame is empty or occupied. Bits 5, 6 and 7 define the operation of the frame in terms of commands, read-/write or status. The next eight bits designate the frame addressee. Following the frame addressee, the next full eight bytes (64 bits) are devoted to data. Lastly, 16 bits are devoted to a cyclical redundancy code for error detection. This accounts, however, only for 96 bits. The difference between 96 and 108 bits is accounted for through the use of 12 discretely placed synchronization bits. For example, one bit is added for each data byte (eight bits). The first synch bit is placed before bit 0, the second synch bit is placed between bits 7 and 8, etc. As previously mentioned, the synchronizing bits are inserted at regular intervals in the data stream primarily to enable the deriving of clocking information from the timing of the data bits even in the presence of a long string of zeros, for example, in the data field.

LEVELS OF SYNCH STATUS AND SYNCH LOSS AND REACQUISITION

There are four levels of synch status that a device adapter or loop controller can be in at any one time. These are being out-of-synch, being in bit synch, being in frame and bit synch (otherwise referred to as tentative synch), and being in true synch.

The maintenance of the so-called "true synch" state is obtained by checking the framing bits at the beginning of every frame. If an incorrect frame synch pattern is detected, true synch is lost and the following frame is not used. A correct CRC at the end of this frame will reestablish true synch. However, if two successive long frame synch patterns are detected, "tentative synch" is lost and it must be reestablished by finding three successive good frame synch patterns. True synch is also lost when a blank frame or a synch frame is detected. True synch can be reestablished only after finding one good CRC after tentative synch is established. True synch, once established is not lost when incorrect CRC bits are detected.

Bit synch is maintained as long as a continuous stream of synch bits is detected every ninth bit. Since loss of bit synch will interrupt the loop operation, it is necessary to confirm that bit synch is definitely lost before the loop controller or device adapter is set in the "out of synch" state.

Bit synch is considered lost when after losing true synch and tentative synch, three missing synch bits are detected in any 12-byte frame period. Once bit synch is lost, the device adapter must stop data feed-through, transmit blank frames, wait to receive synch frames, reestablish bit synch, tentative synch and finally true synch. It should be recognized that the maximum time that any loop should take to achieve true synch depends on the loop latency and the time it takes one adapter to become synchronized. The dynamics of the synch states are illustrated in the following example.

The loop synch system is designed to regain synch with a minimum delay after an interruption. If one assumes a temporary interruption of the loop by the failure of the ith device adapter/serial converter, then the next downstream (i+1) device adapter/serial converter immediately goes out of synch. Indeed, the (i+1) serial converter transmits blank frames which contain no information except synch bits every ninth bit. No frame synch pattern is transmitted. Consequently, the (i+2), (i+3), . . . , device adapters/serial converters downstream lose true synch and tentative synch but remain in bit synch to the freerunning frequency of the (i+1) device adapter/serial converter. When a device adapter/serial converter is in bit synch, it can propagate all signals it receives even though it does not have frame orientation. In this way, the blank frames eventually reach the loop controller/adapter 7, 19. The loop adapter then begins transmitting synch frames. These synch frames are also blank except for the inclusion of the frame synch pattern at the beginning of every frame. The device adapters/serial converters i-j, . . . , i-2,i-1 upstream from the ith adapter/converter will receive the synch frames and propagate them, thereby remaining in bit synch to the master clock in the loop controller/adapter and in tentative synch. They will lose true synch upon the ith device adapter/converter recovering from its failure or being bypassed, the synch frames arrive at the (i+1) device adapter/converter. The device adapter/converter clock which has been free running now begins to synchronize to the incoming synch bits. This occurs slowly enough that the clocks of the device adapters down the loop can follow without losing bit synch. When the (i+1) device adapter/converter finally is in synch to the synch bits, it steps into the bit synch status and propagates the synch frame with its associated frame synch pattern to the next device adapter/converter. Since the next device adapter/converter and all the others down the loop are also in bit synch, then the synch frame finally reaches the loop control/adapter. Meantime, all device adapters/converters that have lost tentative synch will reset their byte counters in order to conform to the frame synch bits that indicate the beginning of each frame so as to regain tentative synch. The loop controller/adapter now transmits proper CRC bits at the end of each frame so that all device adapters/converters can confirm that they have true synch. When the loop controller/adapter confirms true synch, then normal operation resumes.

So far, the general machine organization and functions of the loop system 1 have been described together with some of the properties of loop synchronization. The succeeding paragraphs will describe in more structural and functional detail the operation of the loop system with special reference to bandwidth allocation among the loop controller and device adapters and synchronization. This, in turn, involves a description of frames, frame addressing, and availability, on one hand, and the scheme for detecting out-of-synch conditions among the synchronizing bit patterns on the other hand. Loop system 1 operates with a distributed self-regulated bandwidth allocation protocol. Each device adapter regulates its own bandwidth requirements and maintains a maximum average bandwidth that is equal to the normal device data rate. If a device does not have a normal data rate determined by physical and electronic factors, it will be assigned a maximum data rate which must not be exceeded.

Loop controller 7 operates on a demand/response basis with the option of initiating new operations only when there is no bandwidth demand by the attached devices. The CPU regulates the allocation of bandwidth of the loop system 1 by assigning read/write operations wih aggregate data rates that do not exceed the loop capacity.

The protocol at the device adapter and the loop controller may be made explicit in terms of defining the response of the device adapter or loop controller to the type of frame that it receives.

If the device adapter receives an empty frame, it sends one of the following frames, i.e., read, write request, device status, or empty frames. In response to a full (read or write) frame whose address does not compare with the adapter address, then the frame passes through unchanged. However, if the adapter receives a full frame as an addressee, then it accepts the frame and sends a request/empty frame. Given that the adapter receives a blank/synch frame, said frame passes through if the adapter is in bit synch. If the adapter is out of bit synch, then it transmits blank frames only.

In the case of the loop controller, if it receives an empty frame, then it sends a command/empty frame. If it receives a read frame, it sends an empty frame. If it receives a status frame, it transmits a command/empty frame. In response to a request frame, the controller sends a write frame. In response to a blank frame, or if its phase lock oscillator (PLO) 27 is out of synch, then the controller sends synch frames only.

Loop controller 7 continuously transmits frames on loop 11 containing frame and bit synch information and the proper CRC. The data content of the frames is also regulated by the controller. Controller 7 also receives all frames sent by the device adapters and checks the frames that it sent out and are returned unchanged in order to detect problems in the device adapter. Advantageously, a serial converter should be designed to remove bit jitter. The device adapter may originate frames if it has read data, write requests or status to send to the controller. For this purpose, it may use only empty frames, or full frames that were addressed to it. If the device adapter does not have anything to send to the controller when it receives a full frame addressed to it, the device adapter must change the full frame to empty and append a correct CRC that reflects the entire frame.

LOOP PROTOCOL FOR BANDWIDTH ALLOCATION

Significantly, the loop protocol for bandwidth allocation is concerned mainly with the content of the frames in the loop. Therefore, in the remaining specification there will be referred only to the loop controller and the device adapter as the principle nodes at which the loop protocol is implemented. The only time the controller and adapters do not have logical control of the loop is during selected synchronizing sequences at which point the loop synch hardware takes over.

Figure 4:
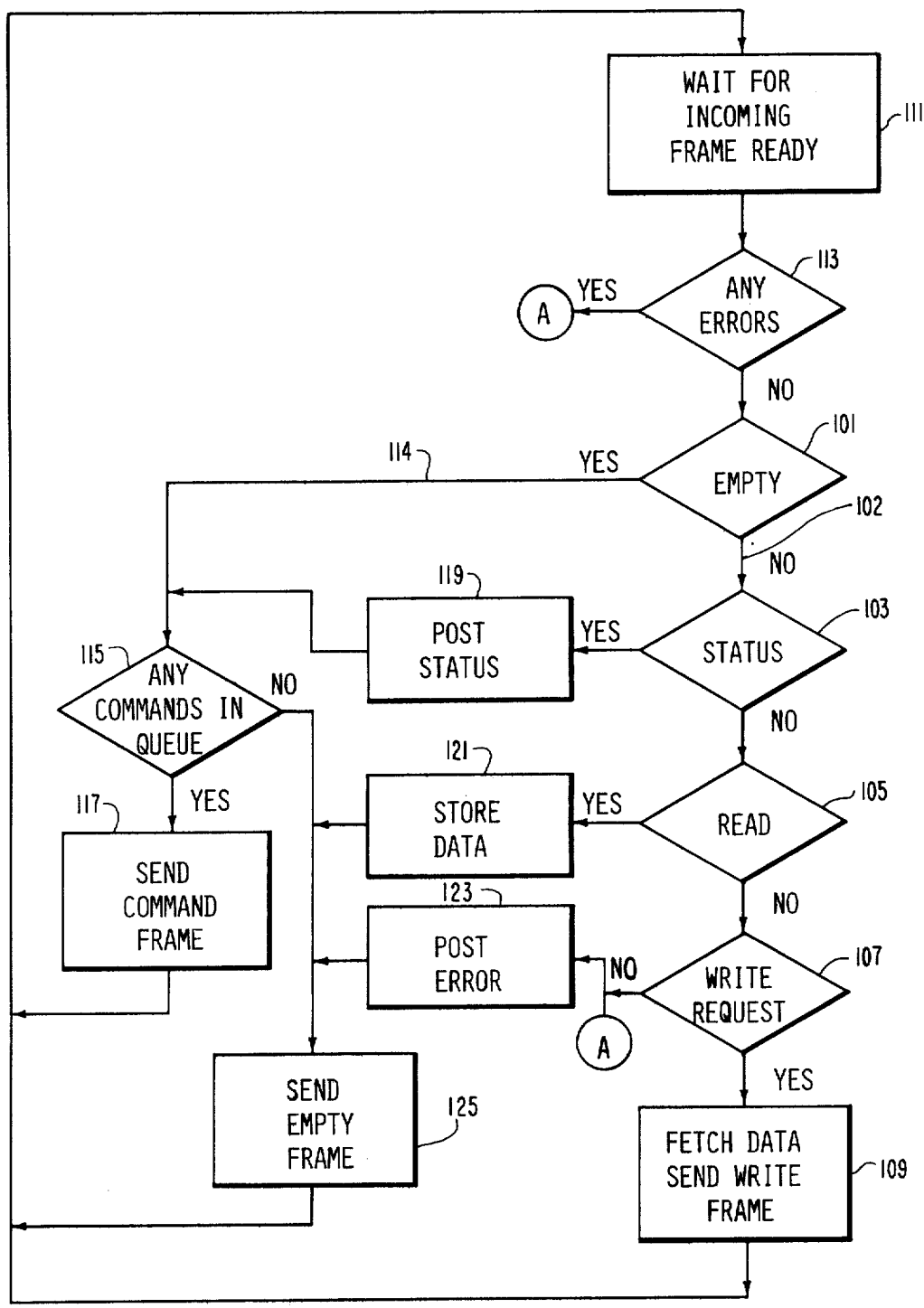
FIGS. 4–7 illustrate the loop protocols of the controller and the device adapters.

Referring now to FIGS. 1 taken together with FIG. 4, the loop controller transmits frames on the loop based on the incoming frames. Aside from the fixed internal delay of controller 7, there is a one-to-one relationship between the incoming and outgoing frames. The only time that the controller has primary control of outgoing frames is when it receives the frame that does not imply a demand for bandwidth such as empty or status. Whenever the controller receives a frame that originated from a device adapter such as a write request or read, the outgoing frame is strictly prescribed by the protocol. The primary control that the loop controller exerts is by transmitting command frames which initiate operations in the devices. When it has no commands to send, the loop controller sends empty frames. Each read frame 105 received by the controller carries with it an implied request for an empty frame 125. This maintains the necessary bandwidth for the read operation to continue. It also allows the flexibility of someone using the frame if the device adapter that requested the frame does not utilize it. If each device adapter follows its bandwidth allocation properly, enough empty frames are available when needed. Each write request 107 must have a corresponding write frame 109 transmitted, and each status frame 103 may have a chained command transmitted 119 or an empty frame 125. Whenever a write or command frame is returned to the loop controller without having been changed to empty, it indicates that the addressed adapter has not accepted it.

DEVICE ADAPTER FRAME USE AND REUSE PROTOCOL

Figure 5:
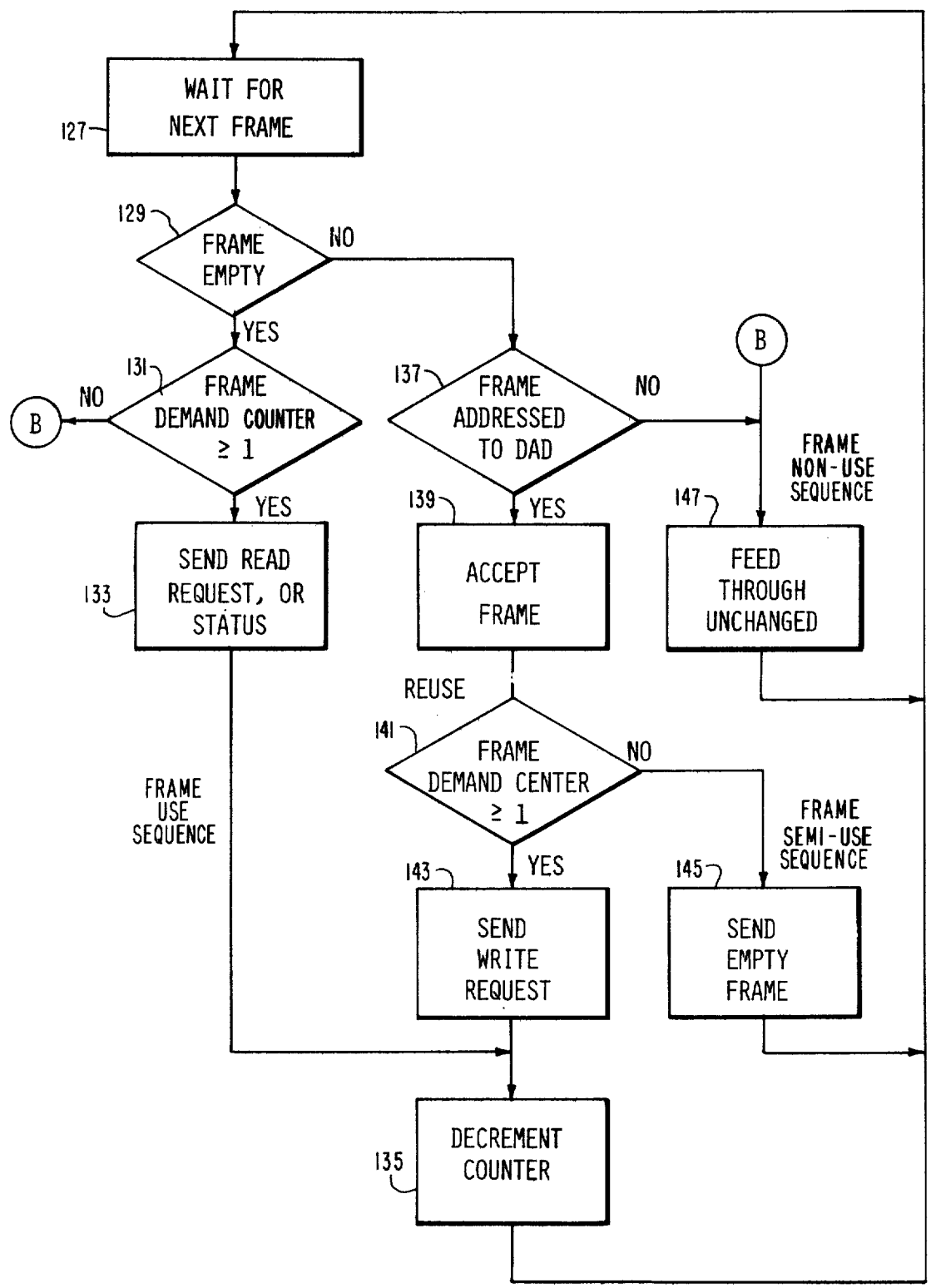

Referring now to FIG. 5, there is shown the device adapter protocol. The device adapter may not originate a frame except if the incoming frame 127, 129 is empty or full and addressed 137 to the adapter. In the former case, the adapter may transmit read, status or write request frames 129, 131, 133, 135. When the adapter receives a full frame 129, 137, 139 addressed to it and the adapter is in the write operation, it may transmit a write request 141, 143, 135 over the frame that it received or else it must change the frame to empty 145. The contents of the frame after the empty bit are unimportant. The device adapter is considered to "use" a frame if it modifies its contents.

DEVICE ADAPTER READ OPERATION

Figure 3:
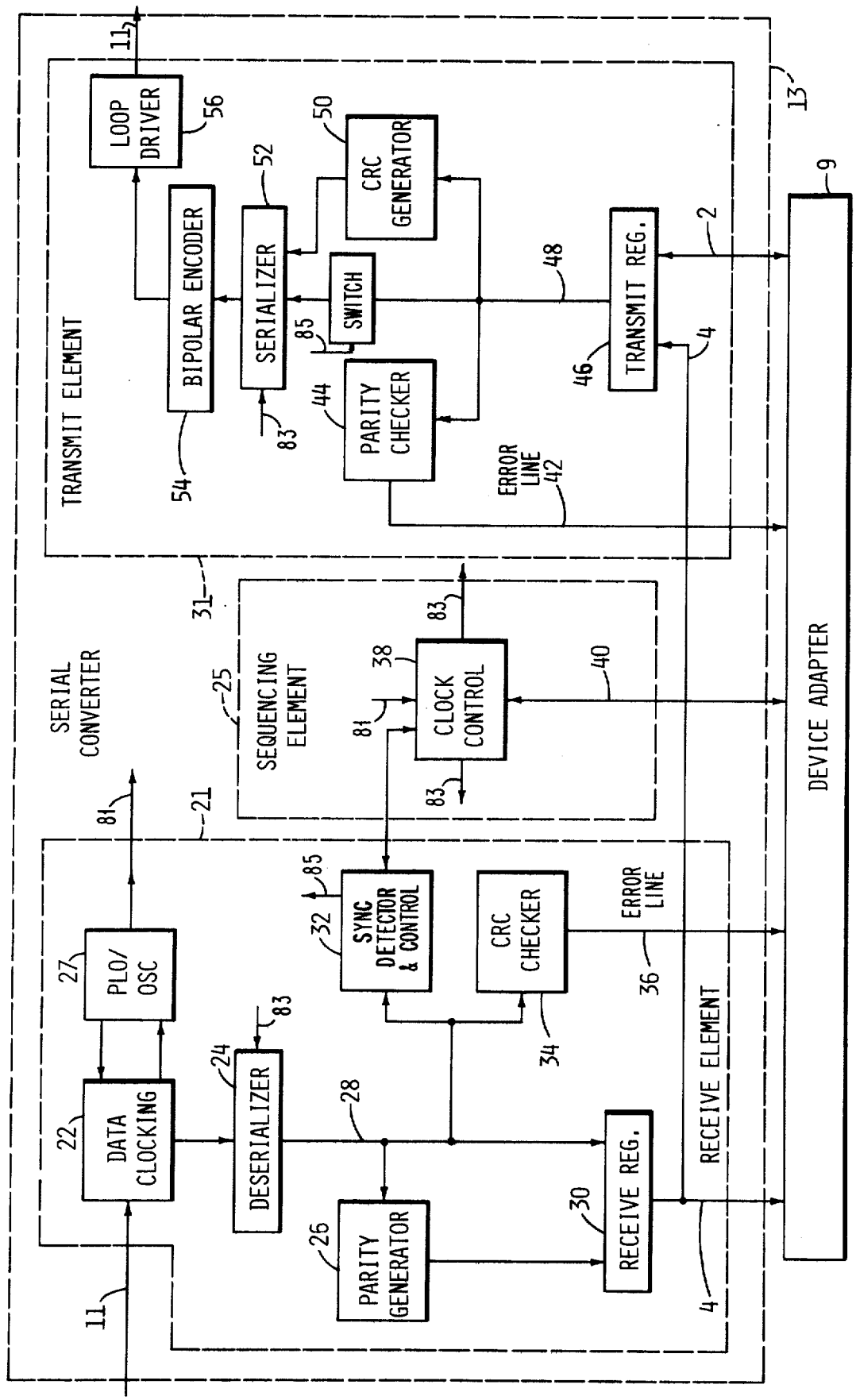
FIG. 3 represents data flow in the serial converters and the loop adapter.
Figure 6:
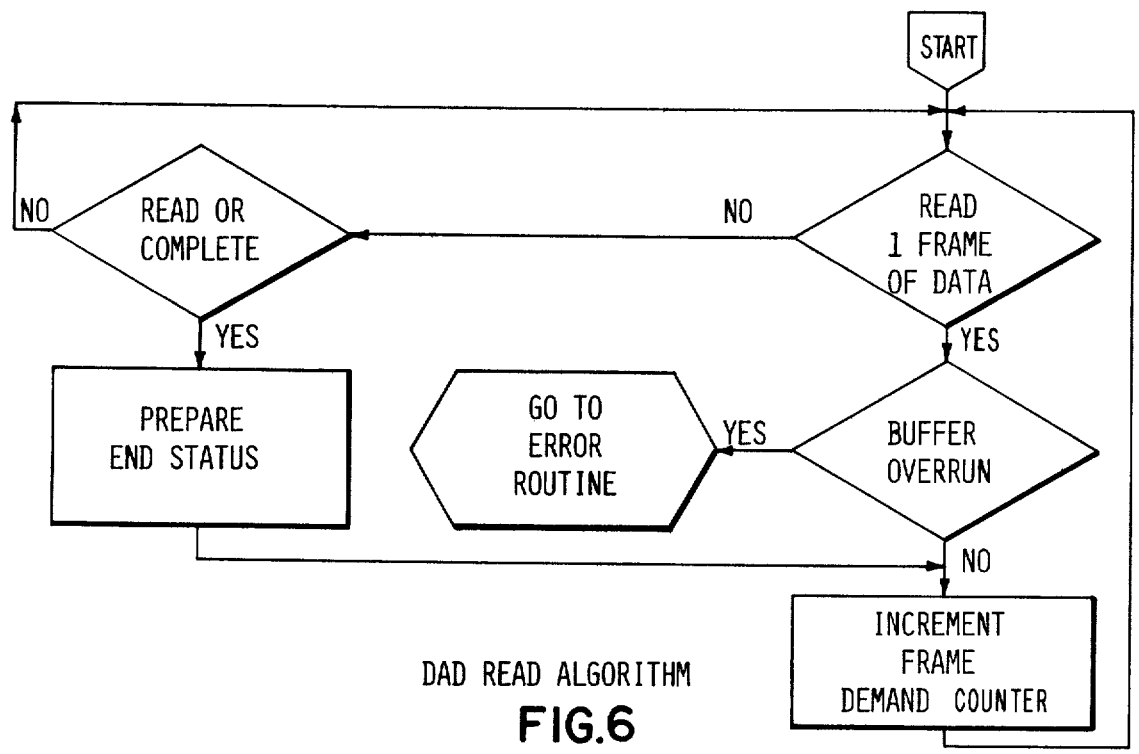

Referring now to FIG. 3 when taken together with FIGS. 5 and 6, the operation of the device adapter read protocol will now be explained. The read protocol is the simpler of the read or write protocols and places the least demand on the adapter data buffer requirement. It is therefore assumed that the data buffer in the device adapter that must be used for the write operation is more than adequate to satisfy the requirements of the read protocol.

The device adapter/serial converter 9, 13 accummulates read data from its associated storage device 3 until 8 bytes or one frame's worth of data has been obtained. The adapter then searches the incoming frames on the loop until it finds an empty frame. In searching for an empty frame, the adapter/converter must also check to make sure that the frame is available. This is done by checking that both bits 3 and 4 in the frame format are "1's". When an available empty frame is found, the adapter changes it to full by making bit 4 at "0" and placing the read mode in bit positions 5, 6 and 7 followed by the device adapter address in bit positions 8 to 15. The eight bytes of data are then placed in sequence with the first byte in bit position 16 to 23 and so forth. As previously mentioned, data is transmitted with the highest order bit of the highest order byte first followed by bits in succeedingly lower order. After the eight bytes of data, two bytes of CRC generator 50 are transmitted that represent the entire frame. It is possible that when a device adapter has accumulated one frame of data, the loop is busy and an empty frame is not immediately available. In this circumstance, the device adapter continues to accummulate read data until an empty frame is found. If by that time two or more frames have been accummulated, then the adapter may utilize whatever empty frames become available for transmission of data including the possibility of utilizing consecutive frames.

DEVICE ADAPTER WRITE OPERATION

Figure 7:
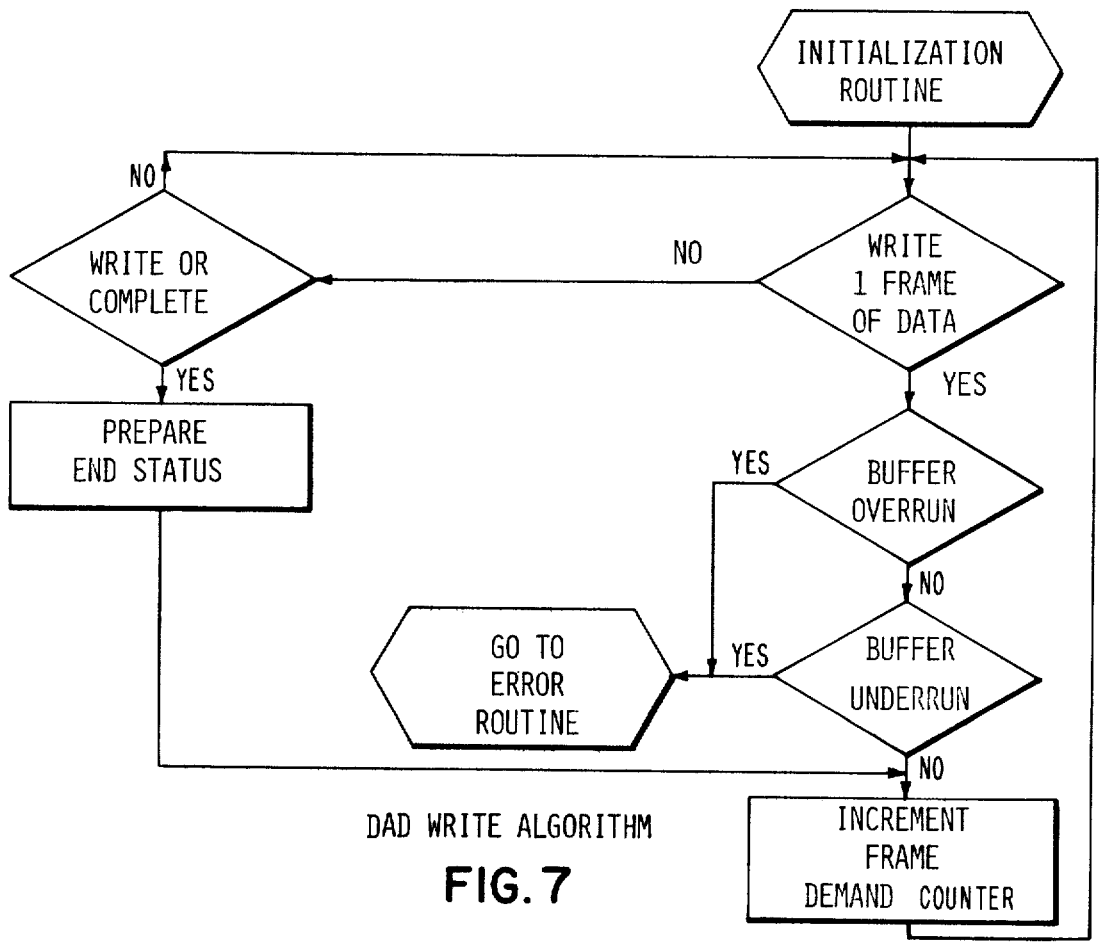

Referring now to FIGS. 3, 5 and 7, the device adapter write protocol will be described. When a device adapter is in a write operation, it must transmit a write request frame for every write frame it wishes to receive. Since writing on most storage devices must begin at a time specified by the device format characteristics and proceed at a rate determined by the device, the device adapter must have the write data available when required. The adapter therefore requests data in advance of its actual usage. The write protocol is the sequence of events and decisions made at the adapter to transmit write requests so as to guarantee that write data will be present when required.

The request generating protocol during actual writing operation of a record is similar to the read protocol in that a request is sent each time one frame (8 bytes) of data has been written. The protocol provides that the adapter will generate a demand for request frames at the normal device data rate. If an empty frame or a write frame assigned to the device adapter is not found until two or more request demands have been generated, the adapter may utilize successive frames when available on which to send requests in order to catch up with the demand and retain the nominal buffer fill.

The initialization routine referred to in FIG. 7 includes sending enough write requests to fill the data buffer in the device adapter before the writing of data actually begins. The size of this data buffer is determined by a number of factors including the maximum loop latency, which is the time it takes between sending a write request and receiving the requested data, the time it takes to find an appropriate frame on which to send the write request, and the time delay within the device adapter to write data on the device after receiving it in a frame.

Since the protocol demand of a one-for-one response from the loop adapter controller results in an invariable loop latency, a device adapter with a sophisticated processing capability can further minimize its buffer size by requesting data before it is needed by a time equal to the loop latency. In this case the buffer size does not have to include loop latency. It only need be large enough to allow for the maximum time delay before finding a frame to send a request, plus the internal delay. The loop latency can be calculated by a device adapter by sending a first write request, after receiving the write command, and measuring the time it takes for the corresponding write frame to arrive.

It is significant to note at this point the reason for minimizing the data buffer size. Data storage on direct access storage devices (DASD) is usually formatted in units called a block or record, each separated by a gap. In order to perform sequential record operations a number of overhead items must be completed within the gap time. Since each gap represents wasted storage space that detracts from the total capacity of an expensive DASD, it is desirable to keep these gaps as small as possible. In a write operation, it is necessary, after completing one record, to receive a new command to write the next record and to request and receive data to fill its buffer within the time of the gap before writing can begin. In a read operation, after reading a record, the buffer, which may be full, must be emptied into the loop before the device can receive the next command. It is therefore apparent that a small buffer can result in smaller gaps and more storage capacity in the DASD.

DATA FLOW IN THE LOOP SYSTEM

In the ensuing paragraphs, a logic level description of the control and data flow of information from the loop controller through the loop and to the storage devices with particular reference to loop adapter 19, a typical serial converter 13.

Figure 2:
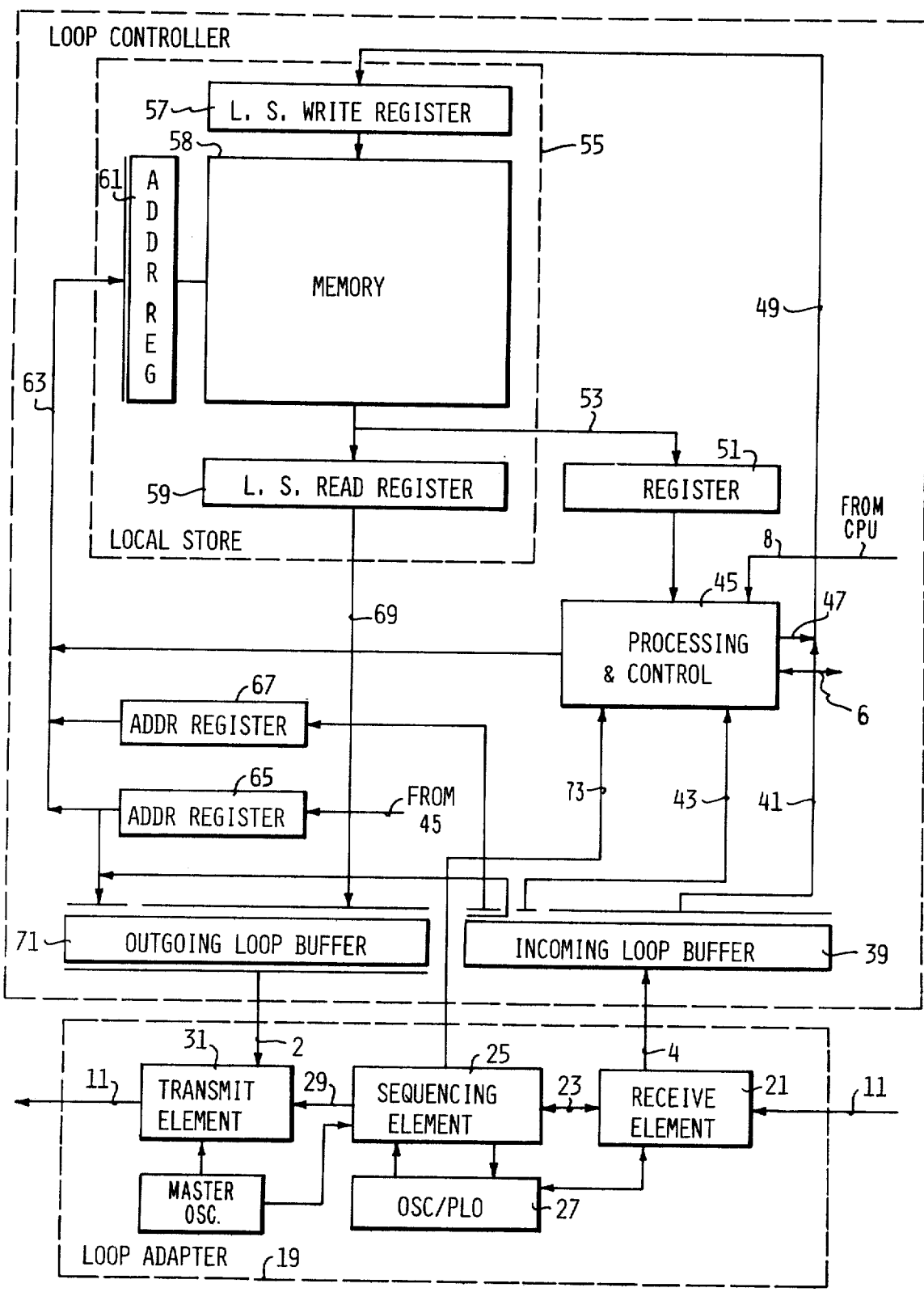
FIG. 2 sets forth some of the logic details of the loop controller and loop adapter set forth in FIG. 1.

Referring now to FIG. 2 when taken together with 1 and 3, there is shown that the loop adapter 19 couples controller 7 over data paths 2 and 4 and control path 73. The loop adapter receives and terminates the serial data signals from the incoming loop 11. The adapter amplifies, clocks the signals and deserializes them in receive element 21 for transmission to the controller over path 4 to incoming loop buffer 39. The adapter also accepts outgoing data from the controller over path 2 and serializes said data in the transmit element 31 for transmission on the loop. The adapter includes circuits for checking the cyclical redundancy code of every incoming frame and for generating the CRC for all outgoing frames. The CRC errors that the adapter may detect as well as other device or data anomalies are communicated to the controller via the control path 73.

The loop controller further comprises a local store 55 capable of receiving data from buffer 39 over path 41 and sending data to buffer 71 over path 69. The local store can be made in size sufficiently large so as to accommodate sequences of microcode in addition to buffering data. In this regard, processing and control element 45 is the point of control and data path connection for data movements to and from main memory 5 through path 6, as well as to and from local store over path 63 and path 53 and register 51.

Element 45 can be a complete sequential machine unto itself or can be a stored program driven controller. In the latter case, the organization of local store in addition to the controller can be implemented in loop systems using CPU techniques. In this regard, reference should again be made to Deutsch et al, U.S. Pat. No. 3,639,694. Deutsch additionally discloses the attachment of CPU/channel to a loop communication system through a primary terminal using a channel interface control element in compliance with the IBM channel interface for System/360 computers. This is shown in FIG. 20 and described at Col. 15, lines 4 through Col. 16, line 10. This CPU transmits and receives information over the channel and desires to either read (RD) or write (WR) information onto and from the storage devices normally attaching the channel through a control unit and a loop communicating system.

The control unit normally interprets these requests (nominally termed "channel command words") and issues appropriate command or status frames to transfer data from the storage devices over the loop to the channel or from the channel over the loop to the storage devices. To this end Deutsch in FIGS. 6, 7 and 19, together with FIGS. 4a–d and the accompanying text sets forth one embodiment for the use of a stored program controlled element (See FIG. 2 elements 45 and 55 in the instant invention) for responding to each of the channel commands and effectuating data transfer. The details of channel architecture are described in Amdahl U.S. Pat. No. 3,400,371 "Data Processing System" issued on Apr. 3, 1968 Cols. 271-289.

Addressing of locations in local store is by a reference plus displacement. The reference is provided by the storage device and the displacement by a pointer contained within element 45. A frame incoming from the loop and placed in buffer 39 has a portion of its address indicative of the storage device. This indication is transferred to register 67. The pointer is supplied by element 45 directly to path 63. In this regard, the pointer is obtained by executing a table lookup within element 45 responsive to an address indication from the frame stored in buffer 39 over path 43. Note, data written into the local store from buffer 39 is transmitted on a path 49 to local store register 57. Parenthetically, data transferred from local store read register 59 to outgoing buffer 71 has the device address supplied to the buffer either from register 65 or from incoming buffer 39. Address data for outgoing frames occurs only upon commands, i.e., a device should execute a read or write operation, or upon a device requesting an assigned empty frame, i.e., "write request". In the case of a command, the device address is supplied by the CPU and communicated to register 65 through element 45. In the case of the "write request," the address received in incoming buffer 39 is directly sent to outgoing buffer 71. Also, parenthetically, register 51 operates as an instruction register when processing element 45 is implemented as a stored program driven controller.

Adapter 19 contains synch control logic to implement the synch system previously described. Since there are two types of synch information transmitted on the loop, namely, bit synch and frame synch, both of them must be attained and further confirmed by a CRC check before true synch is achieved. True synch is a necessary prerequisite before any of the serial converters 12, 13, 15, 17 and adapter 19 can originate information on the loop.

Referring now to FIG. 2 when taken together with FIG. 3, it is apparent that the receive element 21, sequencing element 25 and transmit element 31 of loop adapter 19 are in substantial one-to-one relation with the same elements to be found in the serial converter 13 shown in FIG. 3. In the subsequent description of obtaining initial synch, reference will be made to the elements in FIG. 3 that correspond to the same elements in FIG. 2, not shown.

Referring now to FIG. 3, there is shown a data flow diagram for serial converters 12, 13, 15, 17 and, with modification, loop adapter 19. As is apparent, each of the serial converters and loop adapters is partitioned into three separable elements. These are, respectively, the receive element 21, sequencing element 25, and transmit element 31. The receive element transfers information from loop path 11 through device adapter 9 for recording on the appropriate storage device 3. Transmit element 31 transfers information from the storage device through the adapter for transmission onto loop path 11. Sequencing element 25 maintains the necessary clock controls for sequencing the various detectors and registers within the serial converter under control of the device adapter.

Incoming path 11 terminates in data clocking network 22. The network is responsive to the leading edge of each data bit in order to sample the level of a symmetrical clock signal. Now, each time a data bit is received by network 22, there is generated an increasing or decreasing frequency signal based on the relative phase of the incoming data signal compared to the PLO clock signal. These signals are applied to phase locked oscillator 27.

The function of clock control 38 is to provide timing signals, which signals can be used to govern the operation of the serial converters.

Bit/byte counters included in sequencing element 25 identify which of the 6 two-byte pairs of each frame is being processed in the serial converter and would provide timings for data transfer to and from the device adapter, identification of frame control bytes, and identification of CRC bytes.

When the serial converter is not synchronized to incoming data, then the bit/byte counters will run from the freerunning PLO clocks. When a synch bit is detected, the bit counter portion of sequencing element 25 will be reset to correspond to the synch bit.

Deserializer 24 couples the output from data clocking network 22 to parity generator 26, receive register 30, synch detector 32 and CRC checker 34, all in parallel. The deserializer consists of a bit accummulator which offloads each byte's worth of bits into the receive register 30. Control of shifting and offloading is accomplished by timing signals from the sequencing element 25.

Receive register 30 is an 18 bit buffer partitioned as two bytes of data with parity for transferring data between the serial converter and the device adapter. It is also used as a temporary store of loop data while the device adapter makes a decision about changing the outgoing loop data.

The first byte of deserialized is transferred from the serializer 24 into the first half of receive register 30 over path 28. The second byte then accummulates in the deserializer and is transferred to the second half of the receive register. Note, that parity generator 26 is attached to the deserializer output. Odd parity is generated for each of the two bytes and loaded into the proper position in the receive register.

Each serial converter contains two sets of cyclic redundancy code (CRC) logic. One set is for checking incoming frames and one for generating the code for outgoing frames originating at the serial converter. There are a number of methods for generating and checking CRC known in the art, i.e., parallel or serial, with any one of a number of approprite devisor polynomials.

The CRC register is effectively initialized by blocking feedback during the first two byte's input of each frame. The CRC is transmitted with a high order polynomial coefficient first. The CRC is coded on all bits in each frame with the exception of the synch bits every ninth bit. The bits comprising the CRC are appended to each frame immediately after the data field.

Transmit register 46 is driven by buses 4 and 2. It is an 18-bit buffer and is partitioned as two bytes of data with parity for transferring data between the device adapter and the serial converter or to feed through loop data from the receive register. Parenthetically, the loop adapter does not have a direct connection from the receive register to the transmit register as does the serial converter.

The bit/byte counters and the synch control system govern the functions of the serial converter. The counters and the synch control system feed the logic and sequence of all operations. The byte count indicates the pair of bytes being decoded in the incoming frame. It is used to gate write data across bus 4, read data, status and write requests across bus 2 into register 46.

Parity checker 44 is one of three logic units driven by transmit register 46 over path 48. It checks for odd parity one byte at a time as data is being loaded into the serializer 52 and CRC generator 50. A parity error detected by check 44 will set the parity check line 42 to the device adapter if it was found in data received from the adapter.

Serializer 52 has the function of receiving one byte of parallel data and generating equivalent serial data therefrom. The serializing and loading of register 52 is controlled by the outgoing counter in sequencing element 25.

The output from the serializer 52, in turn, drives encoder 54 and loop drive 56. Both encoder 54 and decoder and data clocking element 22 may be of any form for conditioning or receiving the signal to propagate on path 11.

When a frame is not addressed to a device, it is desired to retransmit it back onto the loop 11 as rapidly as possible. This is the reason for providing path 4 as a direct connection from the receive register 30 to transmit register 46. However, when sync detector and control 32 detects an out of sync condition, it conditions a normally-closed switch in path 48 to open by energizing path 85. Upon the sync anomaly being cured, i.e., the data from deserializer 24 being in phase relation with PLO 27 and clock control 38, then the switch is deenergized and path 48 is no longer interrupted.

Clock control 38 is a distribution network for clocking pulses. In this sense PLO 27 is the local timing reference. Its signals are sent to all of registers and govern the timing of data movements. Synchronism between the deserializer 24 and serializer 52 is maintained by pulses over path 83 from clock control 38.

While the invention has been particularly shown and described with reference to a preferred embodiment thereof, it will be understood by those skilled in the art that various changes in form and details may be made therein without departing from the spirit and scope of the invention.

What is claimed is:

1. In a system having a primary terminal (7, 19) and secondary terminals (12, 13, 9; 15) and a path (11) coupling the primary and secondary terminals to form a loop, the primary terminal attaching a CPU channel (6, 8) to the loop with the secondary terminals (9) attaching independently actuable storage devices (3), each terminal (FIGS. 2-19, 25, 27, 29, 31; FIGS. 3-21, 25, 31) being adapted to selectively generate repetitive framing intervals of duration less than the loop latency, each frame having address, control, and data portions thereof, the control portion containing a code indicative of frame type and frame status such as available or unavailable, empty or full; data being accessed by commands (RD or WR) originating from the CPU channel (6, 8) and transmitted through the primary terminal (45, 55, 69, 71, 2, 19, 11) to the secondary terminals during selected frames; the method comprising the steps of:

sending (FIGS. 4-101 to 111; FIGS. 5-127, 129, 137, 139, 141, 143, 135) a full frame of data by the primary terminal to an assigned secondary terminal each time said primary terminal receives a frame from any given secondary terminal requesting service;

sending (FIGS. 4-111, 113, 101, 103, 105, 121, 125; FIGS. 5-127, 129, 131, 133, 135) an unassigned empty frame by the primary terminal each time said primary terminal receives a full frame of data from an assigned secondary terminal; and sending (FIGS. 4-111, 113, 101, 114, 115, 117; FIGS. 5-127, 129, 131) a frame containing at least one command of status indication by the primary terminal to an assigned secondary terminal, there being a queue of commands (FIGS. 2-55; FIGS. 4-115) in the primary terminal of at least one, said command frame being sent in response to receipt of an unassigned empty frame, or otherwise regenerating by the primary of the unassigned empty frame.

2. In a loop system according to claim 1, wherein the method further comprises the steps of:

reusing a frame received by a secondary terminal (FIGS. 5-127, 129, 137, 141, 143, 131, 133, 135), which received frame contains either the terminal's own address or a special character indicative of the fact that the frame is unassigned by changing the special character to indicate assigned frame status and by writing over its own address in the address portion of the frame and placing new data where appropriate in the data portion of the frame.

3. In a loop system according to claim 1, wherein the framing intervals are of equal fixed length and multibyte in duration.

4. In a system having a primary terminal (7, 19), secondary terminals (12, 13, 9, 15, 17), and a path (11) coupling the terminals to form a loop, the primary terminal attaching a CPU channel (6, 8) to the loop with the secondary terminals attaching independently actuable storage devices (3), each terminal adapted to selectively generate (FIGS. 2, 3-25, 27, 31) repetitive framing intervals of duration less than the loop latency, each frame having address, control, and data portions thereof, the control portion containing a code indicative of frame type and frame status such as available or unavailable, empty or full; data being accessed by commands (RD or WR) originating from the CPU channel and transmitted through the primary terminal (45, 55, 69, 71, 2, 19, 11) to the secondary terminals during selected frames; the method comprising the steps of:

transmitting (FIGS. 4-111, 113, 101, 103, 105, 121, 125; FIGS. 5-127, 129, 131, 133, 135) data from a secondary to the primary terminal by way of one full frame of data inserted into an available empty frame, the primary generating one available empty frame upon receipt of one frame full of data.

5. In a system for the serial transmission of data during equal, fixed-length frames between a primary terminal (7, 19) and ones of a plurality of secondary terminals (12; 13, 9; 15; 17), the terminals being individually spaced along the extent of and coupled to a unidirectional loop communications path, each terminal including means (21, 25, 31 in FIGS. 2 and 3) for receiving from and transmitting frames to the loop synchronized with and occurring within the frame interval, each frame having an address, control, and data portion thereof, the control portion containing a code indicative of frame type, wherein:

each terminal includes:

means (FIGS. 2-21, 31; FIGS. 3-24, 30, 46, 52) for temporarily storing at least a portion of the frame as the frame propagates around the loop;

and further wherein the primary terminal includes:

means (FIGS. 2-45, 55; 63, 65, 67, 69; 71, 39, 51) for generating as assigned frame full of data each time it receives a frame requesting service from a secondary terminal, and for generating an unassigned empty frame each time it receives a frame full of data from a secondary terminal.

6. In a system for the serial transmission of data according to claim 5, wherein each terminal further includes:

means responsive to those frames on the loop which contain either the terminal's own address or a special character indicative that the frame is unassigned for selectively seizing the frame for transmission to another terminal or for insertion of a special character, both obtained by writeover within and during the address, control and data portions of the frame.

* * * * *